United States Patent
Sedjelmaci et al.

(10) Patent No.: US 12,160,745 B2
(45) Date of Patent: Dec. 3, 2024

(54) METHOD AND DEVICE FOR PROCESSING AN ALERT MESSAGE INDICATING THE DETECTION OF AN ANOMALY IN TRAFFIC TRANSMITTED VIA A NETWORK

(71) Applicant: ORANGE, Issy Les Moulineaux (FR)

(72) Inventors: Hichem Sedjelmaci, Chatillon (FR); Tony Capo-Chichi, Chatillon (FR)

(73) Assignee: ORANGE, Issy Les Moulineaux (FR)

( * ) Notice: Subject to any disclaimer, the term of this patent is extended or adjusted under 35 U.S.C. 154(b) by 551 days.

(21) Appl. No.: 17/604,206

(22) PCT Filed: Apr. 15, 2020

(86) PCT No.: PCT/EP2020/060619
§ 371 (c)(1),
(2) Date: Oct. 15, 2021

(87) PCT Pub. No.: WO2020/212442
PCT Pub. Date: Oct. 22, 2020

(65) Prior Publication Data
US 2022/0201490 A1 Jun. 23, 2022

(30) Foreign Application Priority Data

Apr. 18, 2019 (FR) ...................................... 1904158

(51) Int. Cl.
*H04W 12/121* (2021.01)
*H04L 9/40* (2022.01)
*H04W 12/122* (2021.01)

(52) U.S. Cl.
CPC ....... *H04W 12/122* (2021.01); *H04L 63/1416* (2013.01)

(58) Field of Classification Search
CPC .......................... H04W 12/121; H04W 12/122
See application file for complete search history.

(56) References Cited

U.S. PATENT DOCUMENTS

| 2009/0077665 A1* | 3/2009 | Chang ................. H04L 63/1425 726/24 |
| 2011/0023119 A1 | 1/2011 | Rayes et al. |

(Continued)

OTHER PUBLICATIONS

English translation of the Written Opinion of the International Searching Authority dated Jun. 16, 2020 for corresponding International Application No. PCT/EP2020/060619, filed Apr. 15, 2020.

(Continued)

*Primary Examiner* — Barry W Taylor
(74) *Attorney, Agent, or Firm* — David D. Brush; Westman, Champlin & Koehler, P.A.

(57) ABSTRACT

A method for processing, by a device in a network, an alert message received by user equipment connected to the network. The alert message indicates detection of an anomaly by the user equipment in traffic transmitted via the network. The processing method includes: obtaining from the alert message at least one piece of information which is representative of at least one user equipment constraint; processing, by means of an algorithm for detecting cyber attacks, traffic characteristics provided by the user equipment and associated with the detected anomaly, the algorithm for detecting cyber attacks being chosen and/or configured according to the at least one piece of information; and determining from the at least one piece of information, according to an outcome of the processing, and if a cyber attack is detected, a response to the user equipment regarding the detected anomaly.

20 Claims, 2 Drawing Sheets

(56) References Cited

U.S. PATENT DOCUMENTS

2017/0288988 A1* 10/2017 Pignataro ............ H04W 12/122
2019/0370610 A1* 12/2019 Batoukov ............ G06F 11/0754
2021/0360408 A1* 11/2021 Shaw .................... H04W 24/08

OTHER PUBLICATIONS

International Search Report dated Jun. 3, 2020 for corresponding International Application No. PCT/EP2020/060619, Apr. 15, 2020.
Written Opinion of the International Searching Authority dated Jun. 3, 2020 for corresponding International Application No. PCT/EP2020/060619, filed Apr. 15, 2020.
J. Ma et al., "Detecting Distributed Signature-based Intrusion: the Case of Multi-Path Routing Attacks", IEEE Infocom, pp. 558-566, 2015.
P. V. Klaine et al., "A Survey of Machine Learning Techniques Applied to Self-Organizing Cellular Networks", IEEE Communications Surveys & Tutorials, vol. 19, No. 4, pp. 2392-2431, 2017.
L. Fernandez Maimo et al., "A self-adaptive deep learning-based system for anomaly detection in 5G networks", IEEE Access, Special section on cyber-physical-social computing and networking, Mar. 12, 2018.

* cited by examiner

[Fig. 1]
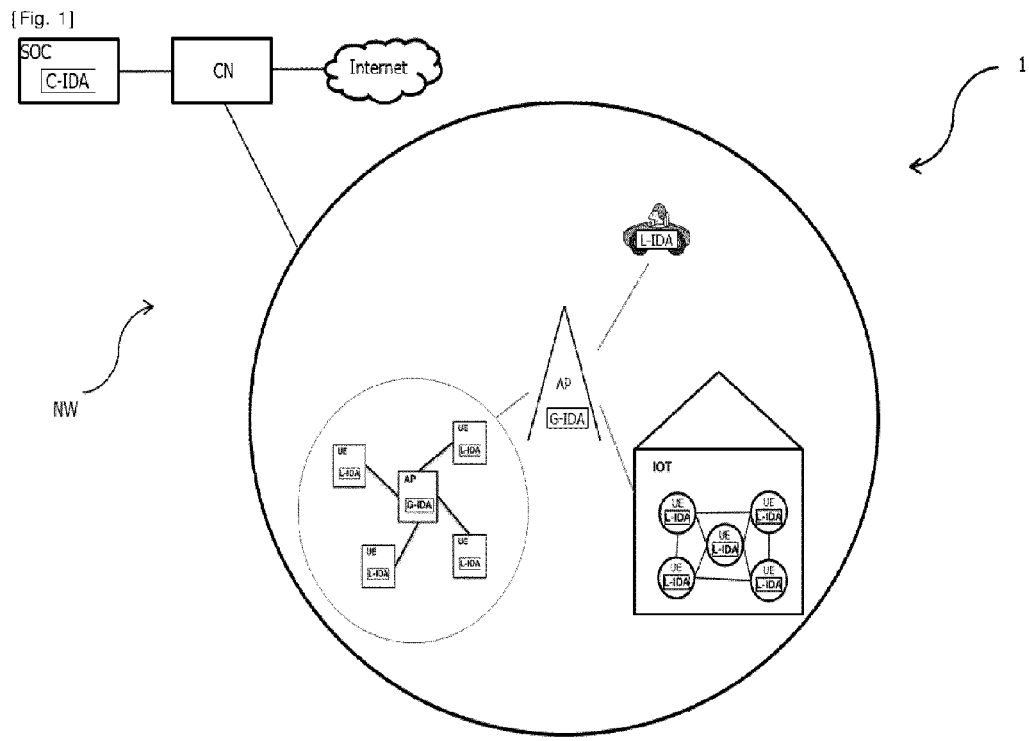
[Fig. 2]
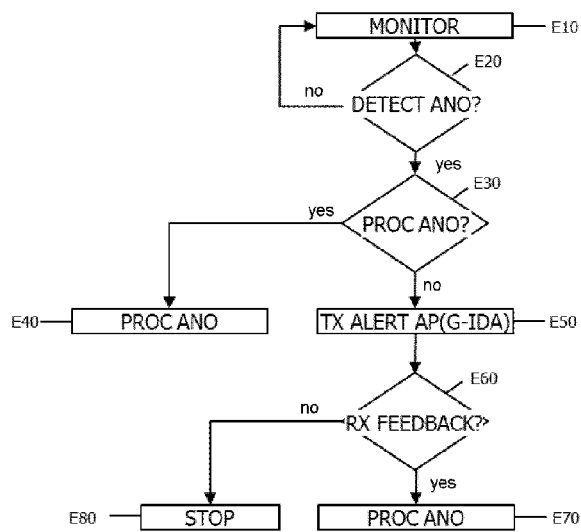

[Fig. 3]
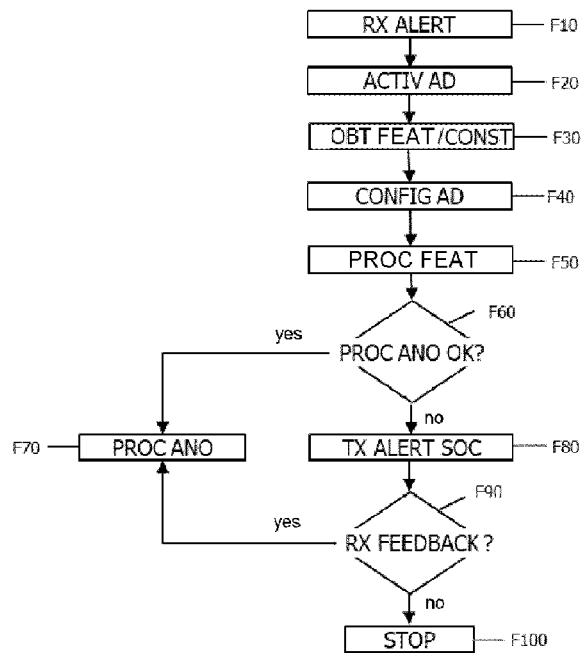
[Fig. 4]
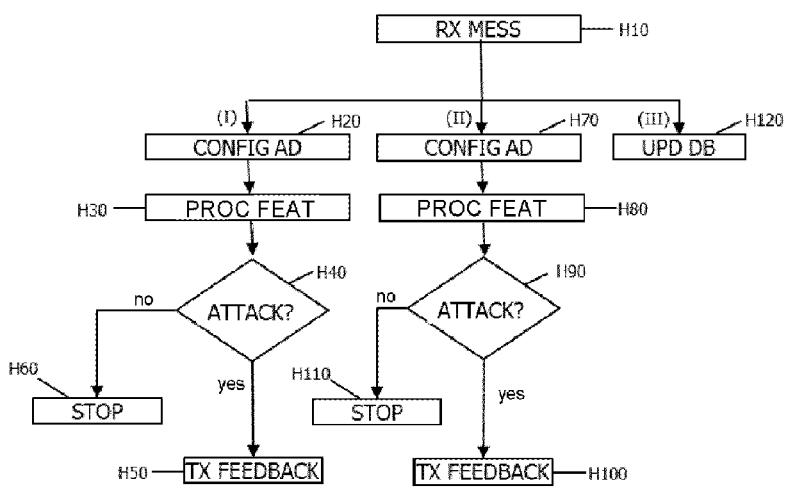

METHOD AND DEVICE FOR PROCESSING AN ALERT MESSAGE INDICATING THE DETECTION OF AN ANOMALY IN TRAFFIC TRANSMITTED VIA A NETWORK

CROSS-REFERENCE TO RELATED APPLICATIONS

This Application is a Section 371 National Stage Application of International Application No. PCT/EP2020/060619, filed Apr. 15, 2020, the content of which is incorporated herein by reference in its entirety, and published as WO 2020/212442 on Oct. 22, 2020, not in English.

PRIOR ART

The invention relates to the general field of telecommunications.

It relates more particularly to a mechanism for detecting cyber attacks in an electronic communications network.

There is no limitation attached to the nature of the network. The invention is however preferably applicable to mobile networks, and in particular to fifth-generation mobile networks or 5G mobile networks.

5G mobile networks, with the advanced communication techniques that they implement and the new capabilities that they offer in particular in terms of data rates, information volumes and connection, are opening up unprecedented usage perspectives that pose real challenges in terms of cyber security. Over the past years, numerous intrusion detection techniques (or IDS for "intrusion detection systems") and defense techniques have been developed, based on proactive approaches that make it possible, on the one hand, to anticipate and to reduce vulnerabilities in computer systems and, on the other hand, to trigger effective mitigation responses when attacks or intrusions are detected in these computer systems. However, 5G, due to its specific characteristics and its constraints, renders conventional intrusion detection techniques inappropriate and ineffective if they are not designed to take into consideration these specific characteristics and these constraints.

The document by L. Fernandez Maimo et al. entitled "A self-adaptive deep learning-based system for anomaly detection in 5G networks", IEEE Access, Special section on cyber-physical-social computing and networking, Mar. 12, 2018 proposes an architecture for detecting cyber attacks in a 5G network that is capable of automatically adapting to traffic fluctuations in the network. The proposed system, which is based on a deep learning technique, may decide to deploy more computing resources (via virtualized network functions) or to adapt the learning approach or the detection model that is applied on the basis of the current cyber defense context in which it is located, this context being identified by the system based on the behavior of the traffic.

The architecture proposed in the document by L. Fernandez Maimo et al. is based on user equipments connected to the network collecting various features of the traffic generated by these user equipments, and an ASD (for "anomaly symptom detection") module for detecting anomaly symptoms and located in the access network aggregating these features. The ASD module performs a rapid search for anomaly symptoms by inspecting the aggregated features. The symptoms are then provided to an NAD (for "network anomaly detection") module for detecting network anomalies and located in the core network. As soon as an anomaly is detected, it is notified to a monitoring and diagnostic module responsible for analyzing the causes of this anomaly and for reporting these causes to a security policy manager able to rapidly take appropriate actions, such as in particular adapting the configuration of the system.

In the system proposed by L. Fernandez Maimo et al., the intrusion detection, although it is performed based on symptoms identified by the access networks by analyzing the traffic features collected by the user equipments, is centralized in the core network. It is in the core network that the main processing operations and computations for concluding whether an intrusion is being perpetrated against the network are performed. This architecture results in a significant overhead (or surplus) in the network, which may have a negative impact on the quality of service and the performance of the network.

DISCLOSURE OF THE INVENTION

The invention makes it possible in particular to rectify this drawback by proposing a hierarchical approach according to which anomaly and intrusion detection is performed on a plurality of levels, taking into consideration the constraints of the equipments belonging to these various levels. Within the meaning of the invention, the more the hierarchical level increases, the more the equipments belonging to this hierarchical level have visibility over the network and resources: they are therefore able to perform more reliable detection of intrusions linked to cyber attacks. There is no limitation attached to the nature of these cyber attacks (viruses, trojans, etc.).

More specifically, the invention proposes, in user equipments, in network devices (belonging to the access network and/or to the core network) and in a security operations center (also commonly referred to as SOC) supervising the network, to implement intrusion and/or anomaly detection techniques adapted to the resources available in each of these equipments, and which take into consideration, when they are executed, constraints of the equipments located on the one or more lower levels so as to be able to give them appropriate feedback if this is relevant. Such constraints may in particular be constraints in terms of resources (for example memory, storage or even computing power) or constraints in terms of network performance (such as latency, data rate, etc. constraints).

In this way, the invention thus utilizes the advantages offered on each level so as to allow rapid and reliable detection of cyber attacks liable to affect a network and the user equipments that are connected thereto, without impacting the performance of the network.

The invention is therefore based on three methods, and on the various equipments able to implement these methods, specifically a user equipment, a network device (which may be located, indiscriminately, in the access network or in the core network), and a security operations center supervising the network.

More specifically, the invention targets a method for processing, by way of a network device, an alert message received from a user equipment connected to the network, and notifying of an anomaly detected by the user equipment in traffic transmitted via the network. The processing method comprises:

- a step of obtaining, from the alert message, at least one item of information representative of at least one constraint of the user equipment;
- a step of processing, by way of a cyber attack detection algorithm, features of the traffic that are provided by the user equipment and associated with the detected anomaly, the cyber attack detection algorithm being selected and/or parameterized on the basis of said at least one item of information; and a step of determining, on the basis of a result of the processing step, and if a cyber attack is detected, of said at least one item of information, a response to the user equipment concerning the detected anomaly.

In correlation, the invention relates to a network device comprising:

a reception module, able to receive an alert message from a user equipment connected to the network, this alert message notifying of an anomaly detected by the user equipment in traffic transmitted via the network;

an obtainment module, configured so as to obtain, from the alert message, at least one item of information representative of at least one constraint of the user equipment;

a processing module, configured so as to process, by way of a cyber attack detection algorithm, features of the traffic that are provided by the user equipment and associated with the detected anomaly, the cyber attack detection algorithm being selected and/or parameterized on the basis of said at least one item of information; and a determination module, configured so as to determine, on the basis of a result of the processing step, and if a cyber attack is detected, of said at least one item of information, a response to the user equipment concerning the detected anomaly.

The invention also targets a supervision method performed by a security operations center supervising at least one network, comprising:

a step of receiving, from a network device, an alert message notifying of an anomaly detected by a user equipment connected to the network or by the network device in traffic transmitted via said network, this alert message comprising features of the traffic that are obtained by the user equipment or by the network device and associated with the detected anomaly, and at least one item of information representative of at least one constraint of the network device;

a step of processing, by way of a cyber attack detection algorithm, the features of the traffic, the detection algorithm being selected and/or parameterized on the basis of said at least one item of information; and a step of determining, on the basis of a result of the processing step and, if an attack is detected, of said at least one item of information, a response to the network device and/or to the user equipment concerning the detected anomaly.

In correlation, the invention relates to a security operations center supervising at least one network, comprising:

a reception module, able to receive, from a network device, an alert message notifying of an anomaly detected by a user equipment connected to the network or by the network device in traffic transmitted via the network, this alert message comprising features of the traffic that are obtained by the user equipment or by the network device and associated with the detected anomaly, and at least one item of information representative of at least one constraint of the network device;

a processing module, configured so as to process, by way of a cyber attack detection algorithm, the features of the traffic, the detection algorithm being selected and/or parameterized on the basis of said at least one item of information; and a determination module, configured so as to determine, on the basis of a result of the processing step and, if an attack is detected, of said at least one item of information, a response to the network device and/or to the user equipment concerning the detected anomaly.

The invention also targets a notification method performed by a user equipment connected to a network, comprising:

a step of detecting an anomaly in traffic transmitted via the network, from features of the traffic that are obtained by the user equipment;

if the user equipment is incapable of determining whether the detected anomaly corresponds to normal behavior or to a cyber attack, a step of sending, to a network device, an alert message notifying it of the detected anomaly, this alert message comprising the features of the traffic and at least one item of information representative of at least one constraint of the user equipment; and a step of receiving a message from the network device concerning the detected anomaly and created on the basis of said at least one item of information.

In correlation, the invention relates to a user equipment connected to a network, comprising:

a detection module, configured so as to detect an anomaly in traffic transmitted via the network from features of the traffic that are obtained by the user equipment;

a sending module, activated if the user equipment is incapable of determining whether the detected anomaly corresponds to normal behavior or to a cyber attack, this sending module being configured so as to send, to a network device, an alert message notifying it of the detected anomaly, this alert message comprising the features of the traffic and at least one item of information representative of at least one constraint of the user equipment; and a reception module, able to receive a message from the network device concerning the detected anomaly and created on the basis of said at least one item of information.

Lastly, the invention also targets a monitoring system for monitoring a network, comprising:

at least one user equipment according to the invention;

at least one network device according to the invention (which may be located in the access network to the network or in the core network); and a security operations center according to the invention.

The invention therefore proposes to hierarchically deploy intrusion detection algorithms (or agents) on various levels that will cooperate with one another so as to improve their efficiency. This cooperation is advantageously performed taking into consideration the constraints present on each level, regardless of the nature of these constraints (for example hardware, software, network performance, security, energy consumption, etc.).

Thus, for example, when considering a user equipment such as a sensor, having a small amount of resources and having major constraints in terms of energy consumption, a relatively simple and lightweight intrusion detection algorithm will preferably be contemplated in this user equipment, such as for example an algorithm based on searching in the traffic transiting through or listened to by the user equipment for a low number of predetermined attack signatures. Such an algorithm, as is known, exhibits performance worse than a machine learning algorithm, which consumes more in terms of resources (processing time, computing resources, etc.).

To compensate for this worse performance (and a higher risk of incorrect detections), according to the invention, if the user equipment detects an anomaly in the traffic exchanged via the network and it is not able to determine the nature of this anomaly (in other words, to determine whether it is normal behavior or an attack), it notifies a network device according to the invention of the anomaly that it has detected so that said network device is able to perform more in-depth analysis using more efficient detection algorithms. Since this device is located in the network (in the access network or in the core network, in other words on a higher hierarchical level in comparison with the user equipment), it has more substantial hardware resources than a user equipment, has better visibility over the traffic exchanged on the network, and does not have any constraints in terms of energy consumption, so to speak. It is therefore possible to use more efficient detection algorithms in this network device, such as for example machine learning algorithms (for example deep learning algorithms), which may make it possible to determine the nature of the anomaly detected by the user equipment.

Advantageously according to the invention, the algorithms used in the network device are chosen and parameterized taking into consideration the constraints of the user equipment; the same applies to the creation of the response made to the user equipment concerning the anomaly detected thereby. By virtue of this provision, it is ensured that the user equipment benefits from a response adapted to its constraints when it detects an anomaly, that is to say from a rapid response if it has a major latency constraint, or requiring a low overhead (surplus of computing, signaling, etc. resources) if its resources are limited, etc.

It will be noted that, if the network device determines that the anomaly is linked to normal behavior of the network, it may abstain from responding to the alert message fed back by the user equipment, with a view in particular to limiting the signaling exchanged on the network and sparing the resources of the user equipment even more (this therefore not having to process any response message).

Likewise, if the network device is not able to determine, using the intrusion detection algorithm that it uses, whether the anomaly that has been reported thereto is caused by normal behavior or a cyber attack, it calls on a higher hierarchical level, specifically a security operations center supervising the network (and possibly other networks managed by one and the same operator or by different operators). In a manner known per se, a security operations center or SOC is a platform for supervising and administering the security of one or more information systems, for example in this case of one or more communication networks. To this end, it is based on various collection tools, event correlation tools, tools for analyzing activities on the networks and on the various equipments forming them (for example databases, applications, servers, user equipments, etc.), and also on the expertise of analysts and security specialists; it may also have remote intervention means. In other words, this is a trusted entity with a great deal of expertise that allows accurate and reliable detection of intrusions in a network.

The invention, by being based on the abovementioned three hierarchical levels, offers an effective solution for detecting intrusions in a network that is particularly well suited to 4G and 5G mobile networks and to the diversity of the user equipments liable to be connected to these networks. It makes it possible to respond rapidly and in a relevant manner in the event of a user equipment detecting an anomaly.

The invention is moreover relatively easy to implement, and may be easily embedded in cyber security solutions such as for example SIEM (for "security information and event management") solutions.

The invention is highly flexible and may more generally be applied to any type of network (2G, 3G, 4G, 5G, etc.) with a view to protecting them from cyber attacks, including when these attacks are complex. It is suited to any type of terminal, and more generally user equipment, by advantageously taking their constraints into consideration.

For example, in one particular embodiment of the processing method, said at least one item of information obtained by the network device is representative of at least one constraint in terms of resources (hardware resources, software resources, etc.) and/or security and/or network performance of the user equipment.

Such a constraint in terms of resources may in particular be an energy consumption or available storage space constraint. Such a constraint in terms of network performance may in particular be a latency, bandwidth, data rate, time to process information provided to the user equipment or surplus amount of information provided to the user equipment constraint. Such a constraint in terms of security may be a cyber attack detection rate, a false positive rate, or a critical nature of the user equipment (if for example a vehicle is involved, the risk encountered by this vehicle due to the presence of a cyber attack may be significant and require a rapid and appropriate response to the encountered risk).

These examples are given only by way of illustration, and there is no limitation attached to the type of constraint to which the user equipment is subject, provided that the network device is informed of these constraints and is thus able to take them into consideration in order to provide a response adapted to the user equipment.

As mentioned above, the constraints may be taken into consideration in the cyber attack detection algorithm selected and applied by the network device in order to analyze the anomaly reported by the user equipment.

Thus, in one embodiment, the cyber attack detection algorithm that is used may be selected by the network device from among:

a detection algorithm based on cyber attack signatures; and a machine learning-based detection algorithm.

A machine learning-based (for example deep learning-based) detection algorithm benefits, as is known, from a better detection rate and a lower false positive detection rate than a detection algorithm based on cyber attack signatures which, for its part, is generally less complex and faster to implement. Of course, these examples are given only by way of illustration, and other detection algorithms may be contemplated in the context of the invention.

Besides the selection of the cyber attack detection algorithm, it is also the dimensioning of the parameters of the selected algorithm that is advantageously able to take into consideration constraints of the user equipment. Thus, in one particular embodiment, when a machine learning-based detection algorithm is selected in the processing step, the training duration under consideration for this algorithm may be parameterized on the basis of said at least one item of information representative of the one or more constraints of the user equipment. For example, if the user equipment has major constraints in terms of latency, it is possible to select, in the network device, a training duration that makes it possible to comply with the latency supported by the user equipment.

As an alternative, when a detection algorithm based on cyber attack signatures is considered, it is the number of signatures used that may be dimensioned on the basis of the constraints of the user equipment (so as to be able to respond more or less quickly depending on these constraints).

In one particular embodiment of the processing method:
the processing step comprises detecting a cyber attack against a user equipment connected to the network and/or against a network element; and
the determination step comprises evaluating a function, called efficiency function, based on at least one metric derived from said at least one item of information and from an attack detection capability of the user equipment, the response being determined on the basis of the value of the efficiency function.

This embodiment makes it possible to provide a response to the user equipment concerning the detected anomaly (which in this case stems from an attack) that satisfies a compromise between the constraints of the user equipment and the accuracy of the attack detection implemented thereby, this compromise being modeled by the efficiency function. This efficiency function may in particular be a weighted sum of a first parameter evaluated based on the one or more constraints of the user equipment and a second parameter reflecting the attack detection capability achieved in the user equipment. Such a capability is given for example by the ratio of the number of attacks detected by the network device to the number of anomalies fed back by the user equipment that it has not been able to.

By evaluating the efficiency function, the network device balances the constraints of the user equipment and the accuracy of the attack detection and creates a response to the user equipment concerning the attack that it has detected that offers a compromise between these two parameters. With regard to an attack that the user equipment has not been able to detect, this response may in particular comprise new signatures and/or new attributes to be applied by the user equipment so as to improve its attack detection capability and in particular be able to detect an attack of the type that caused the anomaly fed back by the user equipment.

More particularly, in one particular embodiment, the response determined by the network device may comprise sending a message to the user equipment comprising N signatures and/or attributes of the attack that are obtained by the network device, N denoting an integer dependent on the value of the efficiency function.

The number N may increase in particular with the value of the efficiency function. Thus, when the efficiency function has a value greater than what is called an upper threshold, all of the signatures and/or attributes of the attack detected by the network device and known thereto may be sent to the user equipment. By contrast, below what is called a lower threshold, the network device may decide not to send any new signature and any new attribute to the user equipment. Lastly, if the value of the evaluated efficiency function is located between the lower threshold and the upper threshold, the network device may decide to send only a subset of the signatures and/or attributes of the detected attack that it possesses, typically the most relevant signatures and/or attributes (i.e. those that occur most often or make it possible to identify an attack more easily) so as to allow the user equipment to be updated.

In one particular embodiment, the number N may furthermore depend on other factors, such as for example a cost factor provided by the user equipment.

This cost factor may be chosen by the manufacturer of the user equipment and reflect its requirements in terms of taking into consideration the constraints of the user equipment. It offers more flexibility by making it possible to additionally weight the number of signatures returned to the user equipment on the basis of the constraints that are critical for the manufacturer.

It will be noted that the signatures of the attack detected by the network device may be provided thereto for example by a security operations center supervising the network.

As mentioned above, in one particular embodiment, if, in the processing step, the network device is incapable of determining whether the detected anomaly corresponds to normal behavior or to a cyber attack, the processing method comprises a step of sending, to a security operations center supervising the network, an alert message notifying it of the anomaly detected by the user equipment and comprising the features of the traffic that are provided by the user equipment and associated with the detected anomaly and at least one item of information representative of a constraint of the network device.

This embodiment makes it possible to benefit from the expertise of the security operations center while still taking into consideration the constraints imposed on the network device (whether these be constraints specific thereto and in particular to network constraints that it has to comply with, or these constraints be imposed thereon indirectly by the user equipment).

It is possible to contemplate other scenarios in which it is relevant for the network device to inform the security operations center of the anomaly detected by the user equipment.

This may be the case when the network device itself locally detects an anomaly that it is not able to.

Thus, in one particular embodiment, the processing method furthermore comprises:
a step of detection, by the network device, of an anomaly in traffic transmitted on the network from features of the traffic that are obtained by the network device;
a step of sending, to a security operations center supervising the network so as to analyze the anomaly detected by the network device, of a notification message notifying of this anomaly comprising said features of the traffic that are obtained by the network device and at least one item of information representative of a constraint of the network device.

The security operations center may also be notified for information purposes, so as to allow the security operations center to keep statistics regarding the network and the attacks to which it is subjected up to date.

Thus, in one particular embodiment, the processing method furthermore comprises, if, in the processing step, the network device detects a cyber attack against a user equipment connected to the network and/or against a network element, a step of notifying a security operations center supervising the network of the detected attack.

In one particular embodiment of the invention, the processing method, the supervision method and/or the notification method are implemented by a computer.

The invention also targets a first computer program on a recording medium, this program being able to be implemented in a computer or more generally in a network device according to the invention and comprising instructions suitable for implementing a processing method as described above.

The invention also targets a second computer program on a recording medium, this program being able to be implemented in a computer or more generally in a security operations center according to the invention and comprising instructions suitable for implementing a supervision method as described above.

The invention relates lastly to a third computer program on a recording medium, this program being able to be implemented in a computer or more generally in a user equipment according to the invention and comprising instructions suitable for implementing a notification method as described above.

Each of these programs may use any programming language and be in the form of source code, object code or intermediate code between source code and object code, such as in a partially compiled form, or in any other desirable form.

The invention also targets an information medium or a recording medium able to be read by a computer and comprising instructions of the first, the second or the third computer program mentioned above.

The information or recording media may be any entity or device capable of storing the programs. For example, the media may comprise a storage means, such as a ROM, for example a CD-ROM or a microelectronic circuit ROM, or else a magnetic recording means, for example a hard disk or a flash memory.

Moreover, the information or recording media may be transmissible media such as an electrical or optical signal, which may be routed via an electrical or optical cable, by radio link, by wireless optical link or by other means.

The programs according to the invention may in particular be downloaded from an Internet network.

As an alternative, each information or recording medium may be an integrated circuit in which a program is incorporated, the circuit being designed to execute or to be used in the execution of the communication method, according to the invention, or the selection method, according to the invention.

In other embodiments, it may also be contemplated for the processing method, the notification method, the supervision method, the network device, the user equipment, the security operations center and the monitoring system according to the invention to have all or some of the abovementioned features in combination.

BRIEF DESCRIPTION OF THE DRAWINGS

Other features and advantages of the present invention will become apparent from the description given below, with reference to the appended drawings which illustrate one exemplary embodiment thereof, devoid of any limiting nature. In the figures:

FIG. 1 shows, in its environment, a monitoring system according to the invention in one particular embodiment;

FIG. 2 shows the main steps of a notification method according to the invention, in one particular embodiment;

FIG. 3 shows the main steps of a processing method according to the invention, in one particular embodiment; and FIG. 4 shows the main steps of a supervision method according to the invention, in one particular embodiment.

DESCRIPTION OF THE INVENTION

FIG. 1 illustrates, in its environment, a monitoring system 1 for monitoring a communications network NW, according to the invention, in one particular embodiment.

In the example contemplated in FIG. 1, the network NW is a 5G ($5^{th}$ generation) communications network comprising a core network CN to which user equipments of the network are able to connect via an access network, such as for example a cellular mobile access network. These assumptions are however not limiting, and the invention is applicable to other types of network, such as for example to 2G, 3G or even 4G networks.

In a manner known per se, 5G networks such as the network NW offer a wide variety of user equipments (generally referenced here by UE) the option to benefit from connectivity (i.e. to be "connected"): vehicles (for example land vehicles or aircraft), IoT (for "Internet of Things") objects such as sensors, watches, etc., smart terminals such as smartphones, digital tablets, laptop computers, etc. These user equipments are of highly diverse natures, allow their users to access services that are also highly diverse, and may therefore have different hardware and network constraints.

Thus, for example, a connected object such as a sensor has a relatively small amount of storage, computing and energy resources in comparison with a computer or a vehicle.

Each of these user equipments UE is connected to the network NW via an access point to the access network, generally referenced AP hereinafter. Such an access point may be, depending on the access network contemplated, a base station BS, an eNodeB node, a gNodeB node, etc. This is a device of the access network and a fortiori of the network NW in the sense of the invention.

As mentioned above, the invention proposes, in order to effectively protect the 5G network NW from cyber attacks (intrusions, viruses, etc.), a hierarchical approach according to which anomaly and intrusion (or attack) detection is performed on a plurality of levels, taking into consideration the constraints of the equipments belonging to these various levels. More specifically, the invention proposes, in the user equipments UE (level termed "local"), in the network NW devices (in the example contemplated in FIG. 1, in particular in the access points AP) (level termed "global") and in a security operations center SOC supervising the network NW (level termed "central"), to implement intrusion and/or anomaly detection techniques adapted to the resources available in each of these equipments, and which take into consideration, when they are executed, the constraints of the equipments located on the one or more lower levels. Such constraints may in particular be constraints in terms of resources (for example memory, storage or even computing power), constraints in terms of network performance (such as latency, data rate, time to process provided information, surplus amount of information provided, etc. constraints), or else constraints in terms of security (such as an attack detection rate, or a false positive rate, etc.).

Thus, in the example contemplated in FIG. 1, the user equipments UE connected to the network NW and the access points AP used by these user equipments to access the network NW are respectively user equipments and network NW devices according to the invention. More specifically, the user equipments UE each embed what is called a "local" intrusion detection agent, L-IDA, comprising means configured so as to implement the steps of a notification method according to the invention; each access point AP similarly embeds what is called a "global" intrusion detection agent, G-IDA, comprising means configured so as to implement the steps of a processing method according to the invention.

In one variant embodiment, only some of the user equipments UE and/or the access points AP embed L-IDA and G-IDA agents, respectively.

Moreover, the security operations center SOC supervising the network NW is also in accordance with the invention and in this case embeds what is called a "central" intrusion detection agent, C-IDA, comprising means configured so as to implement a supervision method according to the invention. It will be noted that the security operations center SOC may also, in one particular embodiment, supervise networks other than the network NW.

More particularly, the security operations center SOC supervises and administers the security of the network NW (and possibly of other networks). To this end, it is based on various collection tools, event correlation tools, tools for analyzing the activities on the networks and on the various equipments forming them (for example databases, applications, servers, user equipments, etc.) and on the expertise of analysts and security specialists; it may also have remote intervention means.

In the embodiment described here, the notification, processing and supervision methods according to the invention are implemented, respectively, within the L-IDA, G-IDA and C-IDA agents by way of software and/or hardware components defining various functional modules duly configured so as to implement the steps of the abovementioned methods (detection, sending and reception modules in particular for the L-IDA agents; reception, obtainment, processing and determination modules in particular for the G-IDA agents; and reception, processing and determination modules in particular for the C-IDA agent). These functional modules may be grouped together in each IDA agent, within three more general categories of modules, specifically:

a monitoring module;
an anomaly and/or attack detection module; and
an intervention or response module.

The abovementioned software components may be integrated into a computer program according to the invention. The user equipments UE, the access points AP and/or the security operations center SOC according to the invention may for example have the hardware architecture of a computer, and comprise in particular a processor, a random access memory, a read-only memory, a non-volatile flash memory, and communication means comprising one or more communication interfaces. In the embodiment described here, the read-only memory of the computer is a recording medium according to the invention, able to be read by the processor and on which there is recorded a computer program according to the invention that comprises, depending on the equipment under consideration, instructions for implementing a notification method according to the invention (if the equipment under consideration is a user equipment), a processing method according to the invention (if the equipment under consideration is an access point or more generally a network device), and a supervision method (if the equipment under consideration is a security operations center).

It will be noted that, in another embodiment, other network NW devices, and in particular devices located in the core network CN, may embed G-IDA agents as mentioned above and implement the processing method according to the invention.

A description will now be given, with reference to FIGS. 2-4, of the main steps of a notification method, of a processing method and of a supervision method as are implemented, respectively, in one particular embodiment, by each user equipment UE, each access point AP and by the security operations center SOC from FIG. 1 in one particular embodiment.

With reference to FIG. 2, in the embodiment described here, the L-IDA agent of each user equipment UE is configured so as to monitor incoming and outgoing traffic (in other words, incoming and outgoing data packets) to and from the user equipment UE (step E10). It is furthermore configured here so as to monitor incoming and/or outgoing traffic to and/or from other user equipments located in its radio neighborhood, for example, and that it is able to receive and listen to.

To perform this monitoring, the L-IDA agent of the user equipment UE uses a monitoring module configured so as to obtain, from analyzing the incoming and outgoing data packets to and from the monitored equipments, a certain number of features of the traffic exchanged via the network NW, such as for example the type of protocols or services corresponding to the exchanged packets, the duration of the communications, the number of failed connections, the number of lost packets, etc. Some features may be extracted by the monitoring module directly from the exchanged data packets (such as for example the type of protocols or services corresponding to the exchanged packets or the duration of the communications); others may be obtained through computing, such as for example the number of lost packets, the received signal strength, the sending rate of the packets, the duration between two consecutive packets (also called "jitter"), etc. These various traffic features are conventionally collected when detecting intrusions in a network, and the way in which these features are obtained is known to a person skilled in the art and is not described in detail here.

It will however be noted that, according to the invention, the features that are collected by the monitoring module of the L-IDA agent may be chosen and dimensioned on the basis of the constraints of the user equipment UE embedding the L-IDA agent. Thus, if the latter has only a few computing and/or storage resources, the monitoring module may collect a small number of features, that are carefully selected, and/or limit the features that need to be computed.

The various features of the traffic that are collected by the monitoring module are provided to an anomaly and/or cyber attack detection module of the L-IDA agent. This detection module of the L-IDA agent applies various security rules with which it has been configured to the various features of the traffic that are provided, allowing it to identify the presence of anomalies in the monitored traffic (for example by comparing certain features with predefined alert thresholds) and/or malicious behavior linked to cyber attacks. To this end, it implements in particular a cyber attack detection algorithm (also called intrusion detection algorithm).

Various attack detection algorithms may be implemented by the L-IDA agent, such as for example a detection algorithm based on cyber attack signatures, or else a machine learning-based detection algorithm.

Detection algorithms based on cyber attack signatures rely on analyzing the incoming and outgoing network traffic: exchanged data packets are compared, by way of preestablished security rules, with a base of signatures representative of known cyber attacks. The security rules are defined by experts and may be updated over time, on the basis of the discovery of new attacks, of new signatures, etc. Such algorithms are known per se and are described for example in the document by J. Ma et al. entitled "Detecting Distributed Signature-based Intrusion: the Case of Multi-Path Routing Attacks", IEEE Infocom, pp. 558-566, 2015.

Machine learning-based detection algorithms are generally more complex than algorithms based on signatures, but have a better detection rate and a lower false positive rate. They may be classified into three categories: supervised algorithms, unsupervised algorithms and reinforcement algorithms. Such algorithms are described in more detail in the document by P. V. Klaine et al. entitled "A Survey of Machine Learning Techniques Applied to Self-Organizing Cellular Networks", IEEE Communications Surveys & Tutorials, vol. 19, no. 4, pp 2392-2431, 2017.

The choice to apply one or the other of these attack detection techniques in the L-IDA agent is made, according to the invention, on the basis of the constraints of the user equipment UE embedding the L-IDA agent, and in particular of its hardware constraints (available hardware resources, constraints in terms of energy consumption, etc.), of its network constraints (low latency, etc.) and/or of its security constraints (attack detection rate, false positive rate, etc.).

Thus, for example for a user equipment UE such as a sensor, the L-IDA agent preferably applies a simple and low-consumption algorithm in terms of computing resources, such as a detection algorithm based on searching for predetermined cyber attack signatures and/or predetermined security rules, provided beforehand to the user equipment and stored in one of its memories. If the user equipment UE has limited storage resources, only a small number of signatures and/or security rules are stored in the user equipment UE, typically the signatures that are most representative of known cyber attacks (in other words the most commonly encountered for these attacks) and liable to affect this type of user equipment.

Thus, not only may the type of detection algorithm applied differ depending on the user equipment, but the parameterization of this algorithm may also differ with a view to achieving a compromise between the constraints of the user equipment and the level of security provided. Applying an unsupervised machine learning algorithm or reinforcement algorithm in a user equipment having major constraints in terms of computing and storage resources, such as a sensor, will thus for example be avoided due to the complexity of such an algorithm.

On the other hand, in a user equipment such as a mobile terminal, since the constraints in terms of energy consumption and storage of the mobile terminal are not excessively major, it will be possible to contemplate applying a lightweight (i.e. not excessively complex) supervised machine learning algorithm, such as for example a behavioral detection algorithm using a support vector machine (or SVM) based on various behavioral attributes (for example number of packets deleted, number of packets sent, etc.) modeling known attacks stored in the user equipment UE.

In a user equipment such as a vehicle, it will be possible to consider a more robust machine learning algorithm such as an unsupervised machine learning algorithm or a reinforcement algorithm. However, the training duration (parameter of the detection algorithm within the sense of the invention) may vary on the basis of the user equipment and its network constraints, in particular the latency supported by the user equipment.

Table 1 below illustrates some examples of compromises applied to the user equipments between hardware, network and security constraints, and contemplated configuration of the anomaly and/or attack detection module.

TABLE 1

| User equipments | Hardware constraints | Network and security constraints | Configuration of the detection module |
|---|---|---|---|
| Mobile terminal (for example smartphone) | Low energy consumption, limited storage | Wide bandwidth; Attack detection and false positive rate; Low latency | Algorithms based on signatures or lightweight machine learning algorithm (for example SVM) |
| IoT connected object (for example sensor) | Very low energy consumption, highly limited storage | Low bandwidth; Attack detection and false positive rate; Low latency | Algorithms based on signatures, with a limited number of security rules |
| Intelligent transport system (for example autonomous vehicle) | | Attack detection and false positive rate; Ultra-low latency, and low communication surplus (overhead) | Unsupervised machine learning algorithms or reinforcement algorithms |

If the L-IDA agent does not detect any anomalies (response no in step E20), it continues to monitor the traffic exchanged on the network NW. It will be noted that, preferably, active monitoring (i.e. continuous monitoring) of the traffic is implemented by the L-IDA agent. However, this monitoring may be temporarily suspended (for example toggle to standby mode) or definitively suspended by the user equipment UE depending on the context, in particular if it is deemed, for example by cyber security experts, that there are no attack risks in the network NW.

If the L-IDA agent detects an anomaly in the traffic (response yes in step E20), two situations may then arise (test step E30):

the L-IDA agent is able to manage this anomaly by itself (response yes in test step E30), in other words, the detection module of the L-IDA agent has identified that this anomaly is linked to a cyber attack that the L-IDA agent knows how to deal with (for example, the anomaly corresponds to a signature of a cyber attack that the detection module knows and the L-IDA agent is configured with an appropriate processing operation to apply in order to respond to this attack), or the detection module of the L-IDA agent has determined that the anomaly that it has detected is linked to normal behavior of the network: in this case, the L-IDA agent deals with the detected anomaly by itself (step E40), specifically, if this anomaly is linked to an attack, it applies, via its intervention module, the processing operation with which it has been configured in order to respond to the detected attack, and if normal behavior of the network NW is involved, it does not do anything and continues to monitor the traffic. It will be noted that the processing operation applied by the intervention module in response to the detected attack may depend on the type of user equipment UE and/or on the nature of the detected attack (typically its severity). Thus, for example, if the user equipment UE is an autonomous vehicle, a response to the attack implemented by the intervention module may consist in reducing the speed of the vehicle in order to avoid critical damage affecting the vehicle (for example crashing the vehicle, altering its speed); another response may be to disconnect the user equipment UE from the network NW, or to switch it off, etc. Preferably, the user equipment UE, via its intervention module, informs the access point AP of the network NW to which it is connected of the detection, where applicable, of an attack by telling it about the nature of this attack and the features of the traffic that allowed it to be detected. This allows the network NW device to update its detection statistics and in turn to inform the supervision center SOC of the detected attack. Said supervision center may then decide, on the basis of the detected attack, on an action in addition to the one applied by the user equipment UE. As a variant, the user equipment UE may directly inform the supervision center SOC of the attack that it has detected;

the L-IDA agent is not able to manage this anomaly by itself (response no in test step E30), in other words, it does not know how to conclude as to the nature of the anomaly that it has detected and is incapable of determining whether the detected anomaly corresponds to normal behavior of the network or to a cyber attack: in this case, the intervention module of the L-IDA agent is configured so as to send an alert message, called ALERT here, to a network NW device equipped with a G-IDA module, specifically in this case to the access point AP to which it is connected in order to access the network NW (step E50). This alert message is sent via the communication interface of the user equipment UE.

The alert message ALERT sent, where applicable, by the intervention module of the L-IDA agent notifies the access point AP, and more particularly its G-IDA agent, of the anomaly detected by the L-IDA agent of the user equipment UE so that said access point performs a more in-depth analysis of this anomaly. The alert message ALERT comprises the features of the traffic that allowed the L-IDA agent to detect an anomaly (that is to say associated with this anomaly), and also, according to the invention, at least one item of information representative of at least one constraint of the user equipment UE (for example hardware, network, security, etc.). It will be noted that, in order to inform the access point AP and/or the supervision center SOC of an attack that it has detected, where applicable (cf. above), the user equipment UE may also use the message ALERT.

Said at least one item of information representative of said at least one constraint of the user equipment may take various forms, in particular depending on the nature of the one or more constraints signaled by the user equipment UE.

In the embodiment described here, the intervention module of the L-IDA agent of the user equipment UE evaluates a threshold function, generally denoted TFx(UE), for all or some of the constraints that it possesses: for example, a threshold function TFe(UE) for its constraints in terms of energy consumption, a threshold function TFm(UE) for its constraints in terms of storage and a constraint TFl(UE) for its constraints in terms of latency. These threshold functions in this case represent levels and have values between 0 and 1. They represent, respectively, the maximum energy, memory and latency levels that the G-IDA agent of the access point AP has to comply with for the user equipment UE in order to detect attacks. They reflect the constraints of the user equipment in terms of energy consumption, storage and latency that the access point and more particularly the G-IDA agent have to take into consideration.

More particularly, in the embodiment described here, the intervention module of the L-IDA agent of the user equipment UE computes the values of the following three linear threshold functions:

$TFe(UE)=a1 \cdot Te(UE)[1-E(UE)/Etot(UE)]+b1$ $TFm(UE)=a2 \cdot Tm(UE)[1-M(UE)/Mtot(UE)]+b2$ $TFl(UE)=a3 \cdot Tl(UE)[1-L(UE)/Ltot(UE)]+b3$ where E(UE) denotes the energy consumed at a time t under consideration in the user equipment UE for detecting attacks and Etot(UE) denotes the total energy in the user equipment UE dedicated to detecting attacks, M(UE) denotes the memory consumed of the user equipment UE at the time t for detecting attacks and Mtot(UE) denotes the total memory in the user equipment UE dedicated to detecting attacks, L(UE) denotes the latency introduced at the time t by the attack detection in the user equipment UE and Ltot(UE) denotes the maximum latency able to be supported in the user equipment UE for detecting attacks. It will be noted that the time t under consideration is chosen to reflect a current state of the consumption of the user equipment UE in terms of energy and memory and the current latency introduced in the user equipment UE; this may be for example the evaluation time of the functions TFe(UE), TFm(UE) and TFl(UE) or the time of detection of the anomaly by the user equipment UE.

The values Te(UE), Tm(UE) and Tl(UE) are set real values also between 0 and 1: they are levels specific to each user equipment UE and with which the user equipment UE may have been configured beforehand (for example statically by its manufacturer or dynamically by the network NW operator). These values Te(UE), Tm(UE) and Tl(UE) respectively define a maximum energy, memory and latency threshold able to be allocated in the user equipment UE to detect attacks, taking into account the total energy, memory and latency that the user equipment UE possesses for this purpose. For example, if the total energy dedicated in the user equipment UE to detecting attacks is Etot(UE) (UE)=100 J (joules) and the energy consumed by the user equipment UE during the detection of the anomaly is E(UE)=25 J (joules), Te(UE)=85% (or 0.85) means that 85% of 75 J (i.e. 100 J–25 J) may still be allocated in the user equipment UE to detecting attacks.

The factors a1, a2, a3, b1, b2 and b3 are real weighting factors chosen between 0 and 1 so as to guarantee values of the functions TFe(UE), TFm(UE) and TFl(UE) between 0 and 1.

They may be determined experimentally or through expertise. They are introduced here so as to reflect the importance of the energy consumption, storage and latency constraints for the user equipment UE under consideration, and may make it possible, depending on their choice, to hierarchize these constraints with respect to one another. Thus, if the energy consumption constraint is a major constraint for the user equipment UE under consideration, the factor a1 is chosen to be greater than the factor b1, and preferably tends toward 1, whereas the factor b1 tends toward 0. By contrast, if the user equipment UE has only a relatively low constraint in terms of energy consumption, a1 may be chosen so as to tend toward 0, while b1 tends toward 1. It will be noted that, if the user equipment UE does not have any constraint in terms of energy consumption, a1=b1=Te(UE)=0 may be adopted in this case.

This example of the three threshold functions TFe(UE), TFm(UE) and TFl(UE) that are evaluated and provided by the user equipment UE is given only by way of illustration, considering that the energy consumption, storage and latency constraints are the most common constraints encountered in user equipments. As a variant, other constraints (for example hardware, network and/or security) may be contemplated in addition or as a substitute to the abovementioned constraints. Furthermore, these constraints may adopt forms other than the threshold functions TFe (UE), TFm(UE) and TFl(UE) (for example, it is possible to have a1=a2=a3=1 and b1=b2=b3=0).

The intervention module of the L-IDA agent of the user equipment UE inserts the computed values of the functions TFe(UE), TFm(UE) and TFl(UE) into the message ALERT sent to the access point AP, as well as the values of E(UE), Etot(UE), M(UE), Mtot(UE), L(UE) and Ltot(UE), for example into the fields of the message that are provided for this purpose. These values are information representative of constraints of the user equipment UE within the meaning of the invention.

As a variant, the intervention module of the L-IDA agent of the user equipment UE may insert, into the message ALERT sent to the access point, the values E(UE), Etot(UE), M(UE), Mtot(UE), L(UE) and Ltot(UE), Te(UE), Tm(UE) and Tl(UE) and the weighting factors a1, b1, a2, b2, a3, b3, and it is the access point AP that evaluates the functions TFe(UE), TFm(UE) and TFl(UE) based on the information provided by the user equipment UE. In yet another variant, the weighting factors a1, b1, a2, b2, a3, b3 may be accessible to the access point AP from a database and might not be provided by the user equipment UE in the message ALERT.

As a variant, the information representative of the constraints of the user equipment UE may take other forms. For example, the user equipment UE may specify, in the message ALERT, an indicator of the type of equipment to which it belongs, this indicator being associated with one or more constraints of user equipments of this type in a prefilled database accessible to the access point AP.

With reference to FIG. 3, upon reception of an alert message ALERT from a user equipment UE by the access point AP (step F10), the G-IDA agent of the access point AP activates its anomaly and attack detection module (step F20).

The module of the access point AP extracts the features of the traffic that are collected by the user equipment UE and associated with the anomaly that said user equipment has detected from the received message ALERT (step F30).

It also obtains, from the received alert message ALERT, information representative of the constraints of the user equipment UE at the origin of the message (step F30).

In the embodiment described here, this information is the values of the threshold functions TFe(UE), TFm(UE) and TFl(UE) and the values of E(UE), Etot(UE), M(UE), Mtot(UE), L(UE) and Ltot(UE) inserted into the message ALERT by the user equipment.

As a variant, as mentioned above, the G-IDA agent of the access point AP may obtain this information by comparing an indicator of the type of user equipment UE at the origin of the message ALERT contained in this message with constraints to which user equipments of this type are subject, stored for example in a database accessible to the access point AP (located or not located in the network NW).

The anomaly and attack detection module is then configured on the basis of the constraints thus identified for the user equipment UE (step F40). This configuration comprises in particular selecting an attack detection algorithm adapted to the constraints of the user equipment UE and/or a parameterization of the attack detection algorithm applied by the detection module adapted to these constraints.

It will be noted that the attack detection algorithm used by the detection module is also adapted to the constraints of the access point AP. However, since the latter is located in the network NW, its constraints, at least its hardware constraints, are generally less significant than those of the user equipment UE (in particular in terms of energy consumption, storage or even computing). The access point AP may therefore apply a more complex and more robust attack detection algorithm than the one applied by the user equipment UE, exhibiting better performance in terms of attack detection rate and/or false positive rate.

By way of example, when configuring the detection module, it is possible to select a detection algorithm that is fast to execute if the user equipment UE has a high or even ultra-high constraint in terms of latency (estimated based on the value of TFl(UE)·[Ltot(UE)−L(UE)], for example through comparison with a threshold). Such an algorithm may be an algorithm based on signatures, the number of signatures under consideration for which is chosen on the basis of the maximum latency able to be supported by the user equipment UE (given by the value of TFl(UE)·[Ltot(UE)−L(UE)]), or, as a variant, a machine learning-based detection algorithm parameterized on the basis of the maximum latency given by the value TFl(UE)·[Ltot(UE)−L(UE)]. One example of such a parameterization consists for example in dimensioning the duration of the training on the basis of the value TFl(UE)·[Ltot(UE)−L(UE)], so as to comply with this maximum latency value supported by the user equipment UE while still guaranteeing an acceptable security level for the user equipment UE (in terms of detection rate or false positive rate, for example). The parameterization values may be determined experimentally beforehand so as to satisfy a series of predefined compromises for example, and allow the G-IDA agent to rapidly select the parameters adapted to the constraints in terms of security, network constraints and hardware resources of the user equipment UE.

The detection module of the G-IDA agent then processes the features of the traffic that are extracted from the received message ALERT with the duly configured detection algorithm (step F50).

It will be noted that, during this processing, the detection module may also use features of the traffic that are collected by the access point AP or fed back by other user equipments connected to the access point AP, or by other access points AP of the network NW located for example in its neighborhood and able to communicate therewith. It is thus able to aggregate a large number of collected features and reinforce the robustness of the detection that is implemented. Advantageously, the access point AP benefits from better visibility over the traffic exchanged via the network NW than each user equipment UE individually.

It will moreover be noted that local detection may also be implemented independently by the access point AP via its detection module based on the features collected by the access point AP, with a view to detecting anomalies occurring in the network NW. There are thus two detection levels performed by the access point AP: local detection of anomalies and attacks based on the features of the traffic that are collected by the access point AP itself, and attack detection performed on the anomalies fed back by the user equipment UE based on the features collected thereby. For local detection of anomalies and attacks based on the features of the traffic that are collected by the access point AP itself, the detection module of the access point AP is configured taking into consideration its own constraints. The access point AP may, as a variant, be equipped with two separate detection modules, one intended to act on the features of the traffic that are fed back by the user equipment UE and configured on the basis of the constraints of the user equipment UE as described above, and one intended to act on the features of the traffic that are collected locally by the access point AP and configured on the basis of the constraints of this access point AP.

Various situations may arise depending on the result of the processing performed by the detection module of the G-IDA agent:

the G-IDA agent is able to manage the anomaly fed back by the user equipment UE by itself (response yes in test step F60), in other words, the detection module of the G-IDA agent has identified that this anomaly is linked to a cyber attack that the G-IDA agent knows how to deal with (for example, the anomaly corresponds to a signature of a cyber attack that the detection module knows), or the detection module of the G-IDA agent has determined that the anomaly detected by the user equipment UE is linked to normal behavior of the network. In this case, the G-IDA agent processes the detected anomaly by itself (step F70), specifically:

if this anomaly is linked to an attack (against a user equipment connected to the network or against a network element), it prepares, via its intervention module, a response intended for the user equipment UE in order to allow it to respond to this attack. The way in which the response is determined is described in more detail below. Moreover, in the embodiment described here, the intervention module of the G-IDA agent sends a notification message notifying of the detected attack to the security operations center SOC supervising the network NW. This message (which may be a message ALERT as described above or another notification message) is intended to alert the security operations center SOC of the ongoing attack so that it updates the information that it possesses on the network NW and the attacks perpetrated against this network, and thus enrich the database and the statistics that it holds on the one or more networks that it supervises. It may contain the features of the traffic that are associated with the detected attack and collected by the user equipment UE, but also other types of information collected for example by the access point. The security operations center may also make a decision with regard to the management of the detected attack and the one or more actions that may be implemented in order to mitigate this attack: registering the user equipment UE or more generally the one or more targets suspected of the attack on a blacklist, updating cryptographic keys, deploying IDA agents in the affected area, etc.;

if normal behavior of the network NW is involved, in the embodiment described here, the intervention module of the G-IDA agent does not do anything, i.e. it does not respond to the user equipment UE in order to maintain the signaling exchanged therewith and its resources for processing the response; the intervention module also does not inform the security operations center of the anomaly fed back by the user equipment UE. As a variant, if the anomaly detected by the user equipment UE is linked to normal behavior of the network NW, the intervention module of the G-IDA agent responds to the user equipment UE by signaling this normal behavior thereto;

the G-IDA agent is not able to manage the anomaly by itself (response no in test step F60), in other words, it does not know how to conclude as to the nature of the anomaly that the user equipment UE has detected and in particular, it is incapable of determining whether the detected anomaly corresponds to normal behavior of the network NW or to a cyber attack: in this case, the intervention module of the G-IDA agent is configured so as to send an alert message ALERT to the security operations center SOC supervising the network NW for additional analysis of the anomaly (step F80). This alert message is sent via the communication interface of the access point AP.

When the detection module of the G-IDA agent detects an attack based on the anomaly fed back by the user equipment UE, the processing of the attack detected by the intervention module of the G-IDA agent and the response that is made to the user equipment UE concerning the anomaly that it has detected and fed back depends on a plurality of parameters, such as in particular the nature and the severity of the attack, the target that it is desired to protect from this attack, etc.

Furthermore, according to the invention, the intervention module of the G-IDA agent determines (i.e. creates) the response that it makes to the user equipment UE concerning the anomaly that it has detected on the basis of the constraints of this user equipment UE.

Such a response may consist for example in sending, in a response message to the user equipment UE, hereinafter called FEEDBACK, new signatures and/or new attack attributes (depending on the detection algorithm used by the L-IDA agent of the user equipment UE) that are intended to be applied by the user equipment UE in order to be able to detect attacks of the type detected by the G-IDA agent. These new signatures (for example for a detection algorithm based on signatures) and/or these new attributes (for example for a behavioral detection algorithm based on machine learning) may be for example the signatures and/or the attributes that were used or considered, where applicable, by the detection module of the G-IDA agent to detect the attack. As a variant, they may have been provided to the G-IDA agent by an external IDS (intrusion detection system) entity, such as for example by the security operations center SOC.

The number of signatures and/or attributes provided in the message FEEDBACK may be dimensioned by the intervention module of the G-IDA agent on the basis of the constraints of the user equipment UE.

To this end, in the embodiment described here, the intervention module of the G-IDA agent evaluates an efficiency function denoted EF(UE), between 0 and 1, and defined by the following weighted sum:

$$EF(UE)=E[a4 \cdot AD(UE)-b4 \cdot TF(UE)]$$

where E[ ] denotes the mathematical expectation, a4 and b4 are real weighting factors between 0 and 1 and determined experimentally taking into consideration for example constraints in terms of attack detection rate and other constraints of the user equipment, AD(UE) denotes the attack detection capability (or efficiency) of the L-IDA agent of the user equipment UE, and:

$$TF(UE)=(Te(UE)+Tm(UE)+Tl)(UE)/(TFe(UE)+TFm(UE)+TFl(UE))$$

The attack (or new attack) detection capability of the L-IDA agent of the user equipment UE may be evaluated by the intervention module of the G-IDA agent on the basis of the reciprocal of the ratio of the number of anomalies fed back by the user equipment UE (with regard to which the user equipment UE was not able to conclude as to an attack or to normal behavior) and the number of attacks detected by the detection module of the G-IDA agent from among these anomalies.

As a variant, the attack detection capability of the L-IDA agent of the user equipment UE may be evaluated so as also to take into consideration the rate of false positives detected by the user equipment UE.

It will be noted that TF(UE) may have been computed by the user equipment UE and be fed back thereby in the message ALERT sent to the access point AP (instead of or in addition to the values of TFe(UE), TFm(UE) and TFl (UE)).

By virtue of the efficiency function EF(AP), the intervention module of the G-IDA agent is able to adapt its response to the user equipment UE on the basis of a compromise chosen between efficiency of the detection performed by the user equipment UE and hardware/network/security constraints of this user equipment UE. Emphasis may be placed more on the efficiency or on the constraints via the choice of the weighting factors a4 and b4.

More particularly, in the embodiment described here, the intervention module of the G-IDA agent adapts the number N of signatures and/or the number of attributes (depending on the detection algorithm used by the L-IDA agent of the user equipment UE) sent to the user equipment UE in response to the anomaly detected thereby on the basis of the value taken by the efficiency function EF(AP). For example:
- if $0.7 \leq EF(AP) \leq 1$: the intervention module sends, to the user equipment UE, all of the new signatures of the attack that are known to/obtained by the G-IDA agent in the message FEEDBACK (emphasis being placed in this case on the attack detection capability of the user equipment UE, which it is desired to improve);
- if $0.1 \leq EF(AP) < 0.7$: the intervention module sends, to the user equipment UE, only a subset of the new signatures and/or new attributes of the attack that are known to/obtained by the G-IDA agent in the message FEEDBACK. The number of new signatures and/or new attributes sent is for example taken to be equal to (AD/x)*100, where x denotes a maximum cost factor supported by the user agreement UE, and provided thereby (for example in the message ALERT). This cost factor is chosen here from among the values {2,3,4,5};
- if $EF(AP) < 0.1$: the intervention module does not send any new signature or any new attribute to the user equipment UE. It may however signal to it, in the message FEEDBACK, that the anomaly detected thereby is indeed linked to a cyber attack, so that it is able to take an appropriate action.

This example of determining the response made to the user equipment UE taking into consideration the constraints thereof is given only by way of illustration, and is not limiting per se. The response that is determined may thus take into consideration other constraints, such as for example constraints in terms of communication overhead, and the number of signatures/attributes may vary on the basis of this overhead. Of course, other types of response may be sent to the user equipment UE than responses containing new signatures and/or new attributes where appropriate: these responses may include in particular update information allowing it to reconfigure itself so as to be more robust to the detected attack, or one or more actions to be implemented by the user equipment UE in response to the detected attack, these one or more actions having been determined by the G-IDA agent given the constraints of the user equipment UE (and in particular its nature), etc.

Other ways of determining the response made to the user equipment UE than considering the abovementioned efficiency function EF(AP) may also be contemplated. For example, the intervention module of the G-IDA agent may directly compare the values of the functions AD(UE) and TF(UE) with one another.

With reference to FIG. 2, the message FEEDBACK is received by the user equipment UE (response yes in step E60), and said user equipment, via its intervention module, applies the actions contained in the message. Thus, by way of illustration, if the message FEEDBACK contains one or more new signatures, the L-IDA agent of the user equipment UE configures the intervention module so that it applies these new signatures in a future implementation.

With reference to FIG. 3, as mentioned above, if the G-IDA agent is not able to decide on the anomaly fed back by the user equipment UE, the intervention module of the G-IDA agent sends an alert message ALERT to the security operations center SOC in step F80. This alert message ALERT notifies the security operations center SOC of the anomaly detected by the user equipment UE and comprises the features of the traffic that are provided by the user equipment and associated with the detected anomaly. It also comprises at least one item of information representative of a constraint of the access point AP.

For example, if the access point AP has a constraint in terms of latency (for example it supports a maximum latency $Tl(AP) \cdot [L(AP) - Ltot(AP)]$ with the notations introduced above for the user equipment UE transposed to the access point AP), this information, in the embodiment described here, is the value of a threshold function TF(AP) computed by the access point AP and defined by:

$$TF(AP) = Tl(AP)/TFl(AP)$$

where $TFl(AP) = a5 \cdot Tl(AP) \cdot [1 - L(AP)/Ltot(AP)] + b5$, where a5 and b5 are real weighting factors between 0 and 1, able to be determined experimentally and chosen so as to guarantee a value of TFl(AP) between 0 and 1.

Of course, this example is given only by way of illustration and is not limiting per se. The constraints that are taken into consideration depend on the network device under consideration embedding the G-IDA agent, if said network device is located in the access network or in the core network of the network NW, etc. As mentioned above, the invention is not limited to embedding G-IDA agents in access points of the access network to the network NW; such agents may be embedded in other network NW devices, in particular in sensitive network elements, such as for example in servers, in the core network CN, in edge servers, etc. Table 2 below illustrates some examples of network devices able to embed a G-IDA agent according to the invention and of constraints (essentially network and security constraints) encountered in these devices, and also the detection algorithms able to be implemented in these devices by their detection modules. Everything that has been described above and that is described below with reference to the G-IDA agent of the access point AP is applicable to each network device incorporating such a G-IDA agent. Thus, for a server SERV of a management platform for managing subscribers to the network, the function TF(SERV) may be a weighted sum taking into consideration the level TFl(SERV), but also a level corresponding to the data rate that has to be complied with by the server and a level corresponding to its bandwidth.

TABLE 2

| Network devices | Network and security constraints | Configuration of the detection module |
|---|---|---|
| Servers of a management platform for managing subscribers to the network | Very low latency, high data rate and wide bandwidth; Attack detection and false positive rates, detection time Communication overhead | Unsupervised machine learning algorithms and/or reinforcement algorithms |

TABLE 2-continued

| Network devices | Network and security constraints | Configuration of the detection module |
|---|---|---|
| CSCF servers or application server of an IMS architecture | Low latency, high data rate and wide bandwidth; Attack detection and false positive rates, detection time Communication overhead | Unsupervised machine learning algorithms and/or reinforcement algorithms |
| Mobile edge computing (MEC) server | Low latency, wide bandwidth; Attack detection and false positive rate, detection time Communication overhead | Unsupervised machine learning algorithms and/or reinforcement algorithms |
| Gateway or server of the core network (for example servers of a mobility management entity (or MME), SGW or PGW gateway) | Very low latency, high data rate and wide bandwidth; Attack detection and false positive rates, detection time Communication overhead | Unsupervised machine learning algorithms and/or reinforcement algorithms |

It will be noted that a similar alert message ALERT is sent by the intervention module of the G-IDA agent of the access point AP if this detects an anomaly based on the features that it has collected by itself locally via its monitoring module and is not able to decide on this anomaly (that is to say determine whether it is an attack or normal behavior of the network NW). The alert message ALERT then sent to the security operations center SOC for additional analysis of the anomaly detected by the detection module of the G-IDA agent comprises the features collected by the monitoring module of the G-IDA agent and also the information TF(AP), L(AP) and Ltot(AP) representative of the constraints of the access point AP (constraint in terms of latency in the example contemplated here).

If the G-IDA agent is capable of determining the anomaly that it has detected locally, it deals with this anomaly in a manner similar to what has been described above for the L-IDA agent. In other words, if this anomaly is linked to an attack, it applies, via its intervention module, the processing operation with which it has been configured in order to respond to the detected attack and notifies the security operations center of the detected attack, and if it involves normal behavior of the network NW, it does not do anything and continues to monitor the traffic. It will be noted that the processing operation applied by the intervention module in response to the detected attack may depend on the type of network device under consideration embedding the G-IDA agent and/or on the nature of the detected attack (typically its severity).

With reference to FIG. 4, it is assumed that the security operations center SOC receives a message from a network NW device, such as for example the access point AP (step H10).

A plurality of scenarios may arise:
scenario (I): the received message is a message ALERT notifying the security operations center SOC of the detection of an anomaly by a user equipment UE connected to the access point AP (or managed thereby) that neither the user equipment nor the access point AP was able to, in other words to determine whether this is an anomaly linked to an attack or to normal behavior of the network NW and of the user equipments that are connected thereto;
scenario (II): the message is a message ALERT notifying the security operations center SOC of the detection of an anomaly by the access point AP that the access point AP was not able to;
scenario (III): the message is a notification message notifying of an attack detected by a user equipment or by an access point AP of the network NW.

In scenario (I), the received message ALERT contains the features of the traffic that are associated with the anomaly detected by the user equipment UE and collected thereby. It also contains at least one item of information representative of a constraint of the access point AP (for example a latency constraint given by the value TF(AP) described above).

The detection module of the C-IDA agent embedded in the security operations center SOC is then configured on the basis of said at least one item of information representative of the constraint of the access point (step H20). This configuration comprises in particular selecting an attack detection algorithm adapted to the constraints of the access point AP and/or a parameterization of the attack detection algorithm applied by the detection module adapted to these constraints.

It will be noted that the security operations center has an overall view over the one or more networks that it supervises and does not have any hardware constraints in terms of storage, energy consumption or computing power, so to speak. It is therefore able to apply a more complex and more robust attack detection algorithm than the one applied by the user equipment UE and than the one applied by the access point AP (for example detection algorithms based on deep learning, unsupervised algorithms or reinforcement algorithms), exhibiting better performance in terms of attack detection rate and/or false positive rate. It may furthermore benefit from the expertise of analysts and security specialists, who may provide a human opinion with regard to the detected anomalies, for example via a user interface provided for this purpose, and make it possible to reduce in particular the detected false positive rate.

The detection algorithm applied by the detection module may advantageously be parameterized taking into consideration the constraints of the access point AP. By way of example, if a latency constraint is provided in the message ALERT by the access point AP and a machine learning algorithm is used by the detection module, the duration of the training may be parameterized so as to comply with the latency signaled by the access point AP.

The detection module of the C-IDA agent then processes the features of the traffic that are extracted from the received message ALERT with the duly configured detection algorithm (step H30).

It will be noted that, during this processing, the detection module may also use features of the traffic that are fed back by other user equipments connected to the access point AP, or by other access points AP or other network NW devices that it supervises. It may thus aggregate a large number of collected features and reinforce the robustness of the detection that is implemented.

If, following the processing of the features of the traffic that are associated with the anomaly detected by the user equipment UE, the detection module of the C-IDA agent detects the presence of an attack (response yes in test step H40), the response module of the C-IDA agent determines a response to be transmitted to the access point AP concerning the anomaly on the basis of the constraint information of the access point AP (step H50).

For example, if this constraint is a constraint in terms of latency, the intervention module of the C-IDA agent responds without delay to the access point AP by signaling the detected attack to it, for example in a message FEEDBACK, and by inserting, into its response, at least one action to be implemented by the access point AP and/or by the user equipment UE in order to mitigate the attack. This action may consist for example in using one or more new signatures of the attack and/or new attributes provided by the security operations center, or other information intended to allow the access point AP to detect such an attack.

Another action may consist in the access point disconnecting the user equipment and isolating the malicious node (user equipment or other network NW node), in updating cryptographic keys, of information sent to experts, notifications from the area infected by the attack, of a broadcast to other operators, of a notification sent to the user of the user equipment UE, etc.

As a variant, if the constraint is a communication overhead constraint or bandwidth constraint, the intervention module of the C-IDA agent may modulate the number of new signatures transmitted to the access point AP on the basis of this constraint. To determine the number of new signatures to be transmitted, the intervention module of the C-IDA agent may proceed in a manner similar to what has been described above for the intervention module of the G-IDA agent, by evaluating an efficiency function EP(SOC) based on the new attack detection capability AD(SOC) of the C-IDA agent and the constraint TF(AP), and by modulating the number of signatures to be transmitted on the basis of the obtained value of the efficiency function EP(SOC) (x then denoting a cost factor of the access point AP, included thereby in the message ALERT, for example).

If on the other hand the detection module of the C-IDA agent determines (for example through the intermediary of cyber experts) that the detected anomaly is linked to normal behavior (response no in test step H40), then the intervention module of the C-IDA agent does not respond here to the alert message sent by the access point AP (step H60).

With reference to FIG. 3, if the access point AP receives, from the security operations center SOC, a response message FEEDBACK to its message ALERT concerning the anomaly fed back by the user equipment UE (response yes in step F90), this means here that an attack has been detected by the security operations center SOC based on this anomaly. The intervention module of the G-IDA agent of the access point AP extracts, from the received message FEEDBACK, the one or more actions recommended by the security operations center SOC in response to the detected attack, and creates a response to the user equipment UE (message FEEDBACK) based on these one or more actions, taking into consideration the constraints of the user equipment UE, as described above (step F70).

If the access point AP does not receive any response message FEEDBACK to its message ALERT, then this means that the anomaly fed back to the security operations center corresponds to normal behavior of the user equipments and/or the network NW. The response module of the G-IDA agent of the access point AP then does not transmit any response here to the message ALERT received from the user equipment UE in order to preserve the resources of the network and of the user equipment UE (step F100). As a variant, it may signal to the user equipment UE that the anomaly detected thereby is linked to normal behavior.

It will be noted that the intervention module of the C-IDA agent may also transmit, directly to the user equipment UE, a message FEEDBACK similar to the one transmitted to the access point AP in the event of detecting an attack. This direct communication between the security operations center SOC and the user equipment UE makes it possible to reinforce security within the network NW and to manage situations in which the access point AP might itself be subject to an attack.

With reference to FIG. 4, in scenario (II), the received message ALERT contains the features of the traffic that are associated with the anomaly detected locally by the access point AP and collected thereby. It also contains at least one item of information representative of a constraint of the access point AP (for example a latency constraint given by the value TF(AP) described above).

The detection module of the C-IDA agent embedded in the security operations center SOC is then configured on the basis of said at least one item of information representative of the constraint of the access point in a manner similar or identical to what has been described above with reference to step H20 (step H70). This configuration comprises in particular selecting an attack detection algorithm adapted to the constraints of the access point AP and/or a parameterization of the attack detection algorithm applied by the detection module adapted to these constraints.

The detection module of the C-IDA agent then processes the features of the traffic that are extracted from the received message ALERT with the duly configured detection algorithm (step H80).

If, following the processing of the features of the traffic that are associated with the anomaly detected by the access point AP, the detection module of the C-IDA agent detects the presence of an attack (response yes in test step H90), the response module of the C-IDA agent determines a response to be transmitted to the access point AP concerning the anomaly on the basis of the constraint information of the access point AP (step H100). To this end, it proceeds in a manner similar or identical to what has been described above for step H50.

If on the other hand the detection module of the C-IDA agent determines (for example through the intermediary of cyber experts) that the detected anomaly is linked to normal behavior (response no in test step H90), then the intervention module of the C-IDA agent does not respond here to the alert message sent by the access point AP (step H110).

With reference to FIG. 3, if the access point AP receives, from the security operations center SOC, a response message FEEDBACK to its message ALERT concerning the anomaly that it has detected locally and fed back to the security operations center SOC (response yes in step F90), this means here that an attack has been detected by the security operations center SOC on the basis of this anomaly. The intervention module of the G-IDA agent of the access point AP extracts, from the received message FEEDBACK, the one or more actions recommended by the security operations center SOC in response to the detected attack, and implements these actions (step F70). Such an action may consist for example in updating the security rules applied by its attack detection module (for example signatures, detection thresholds, etc.).

If it does not receive any response FEEDBACK to its message ALERT concerning the anomaly that it has detected locally (response no in test step F90), this means that the anomaly that it has detected is linked to normal behavior (step F100). The access point AP continues to locally monitor the traffic exchanged via the network NW.

With reference to FIG. 4, in scenario (III), the notification message received by the security operations center is used thereby to update and enrich the databases and the statistics that it holds on the one or more networks that it supervises (step H120). The security operations center SOC may also make a decision with regard to the management of the detected attack and the one or more actions that may be implemented in order to mitigate this attack: registering the user equipment UE or more generally the one or more targets suspected of the attack on a blacklist, updating cryptographic keys, deploying IDA agents in the affected area, etc. Where appropriate, one or more actions to be executed with a view to mitigating the attack may be transmitted to the access point AP and/or to the user equipment UE, for example in a response message to the notification message.

The invention therefore proposes an innovative mechanism that is based on the hierarchical deployment, on various levels of a network, of intrusion detection agents (IDA) configured so as to collaborate with one another in order to improve the security of the network, and to do so while allowing improved detection (and mitigation) of internal and/or external cyber attacks perpetrated against this network. The invention makes it possible to reliably and rapidly detect attacks in a network while at the same time taking into consideration in particular hardware, network or security constraints of the various equipments connected to this network or belonging to this network. It also makes it possible to provide a response to the appropriate detected attacks that takes these constraints into consideration. The invention is therefore particularly well suited to $5^{th}$ generation networks that offer connectivity to a wide variety of user equipments subject to highly diverse constraints.

The invention claimed is:

1. A processing method for processing, by way of a network device, an alert message received from a user equipment connected to the network, said alert message notifying of an anomaly detected by the user equipment in traffic transmitted via the network, said processing method being implemented by the network device and comprising:
  obtaining, from the alert message, at least one item of information representative of at least one constraint of the user equipment;
  processing, by way of a cyber attack detection algorithm, features of the traffic that are provided by the user equipment and associated with the detected anomaly, the cyber attack detection algorithm being selected and/or parameterized on the basis of said at least one item of information; and
  determining, on the basis of a result of the processing act, and in response to a cyber attack being detected, of said at least one item of information, a response to the user equipment concerning the detected anomaly,
  wherein the determining comprises evaluating a function, called efficiency function, based on at least one metric derived from said at least one item of information and from an attack detection efficiency of the user equipment, the response been determined on the basis of the value of the efficiency function.

2. The processing method as claimed in claim 1, wherein said at least one obtained item of information is representative of at least one constraint in terms of resources and/or network performance of the user equipment.

3. The processing method as claimed in claim 2, wherein: the constraint in terms of resources is an energy consumption or available storage space constraint;

the constraint in terms of network performance is a latency, bandwidth, data rate, time to process information provided to the user equipment or surplus amount of information provided to the user equipment constraint.

4. The processing method as claimed in claim 1, wherein the cyber attack detection algorithm is selected from among:
  a detection algorithm based on cyber attack signatures;
  a machine learning-based detection algorithm.

5. The processing method as claimed in claim 4, wherein, when a machine learning-based detection algorithm is selected in the processing, a training duration under consideration for said algorithm is parameterized on the basis of said at least one item of information.

6. The processing method as claimed in claim 1, wherein:
  the processing comprises detecting a cyber attack against a user equipment connected to the network and/or against a network element.

7. The processing method as claimed in claim 1, wherein the determined response comprises sending a message to the user equipment comprising N signatures and/or attributes of the attack that are obtained by the network device, N denoting an integer dependent on the value of the efficiency function.

8. The processing method as claimed in claim 7, wherein N furthermore depends on a cost factor provided by the user equipment.

9. The processing method as claimed in claim 7, wherein the signatures and/or attributes of the attack are obtained by the network device from a security operations center supervising said network.

10. The processing method as claimed in claim 1, comprising, in response to, in the processing, the network device being incapable of determining whether the detected anomaly corresponds to normal behavior or to a cyber attack, sending, to a security operations center supervising the network, an alert message notifying the security operations center of the anomaly detected by the user equipment and comprising the features of the traffic that are provided by the user equipment and associated with the detected anomaly and at least one item of information representative of a constraint of the network device.

11. The processing method as claimed in claim 1, furthermore comprising:
  detecting, by the network device, an anomaly in traffic transmitted on the network from features of the traffic that are obtained by the network device;
  sending, to a security operations center supervising the network so as to analyze the anomaly detected by the network device, of a notification message notifying of this anomaly comprising said features of the traffic that are obtained by the network device and at least one item of information representative of a constraint of the network device.

12. The processing method as claimed in claim 1, furthermore comprising, in response to, in the processing, the network device detecting a cyber attack against a user equipment connected to the network and/or against a network element, notifying a security operations center supervising the network of the detected attack.

13. A supervision method performed by a security operations center supervising at least one network, comprising:
  receiving, from a network device, an alert message notifying of an anomaly detected by a user equipment connected to the network or by the network device in traffic transmitted via said network, said alert message comprising features of the traffic that are obtained by the user equipment or by the network device and associated with the detected anomaly, and at least one item of information representative of at least one constraint of the network device;

processing, by way of a cyber attack detection algorithm, said features of the traffic, the detection algorithm being selected and/or parameterized on the basis of said at least one item of information; and determining, on the basis of a result of the processing step and, in response to an attack being detected, of said at least one item of information, a response to the network device and/or to the user equipment concerning the detected anomaly, wherein the determining comprises evaluating a function, called efficiency function, based on at least one metric derived from said at least one item of information and from an attack detection efficiency of the user equipment, the response been determined on the basis of the value of the efficiency function.

14. A notification method performed by a user equipment connected to a network, comprising:

detecting an anomaly in traffic transmitted via the network, from features of the traffic that are obtained by the user equipment;

in response to the user equipment being incapable of determining whether the detected anomaly corresponds to normal behavior or to a cyber attack, sending, to a network device, an alert message notifying it of the detected anomaly, said alert message comprising said features of the traffic and at least one item of information representative of at least one constraint of the user equipment; and receiving a message from the network device concerning the detected anomaly and created on the basis of a value of an efficiency function evaluated by said network device when a cyber attack against said user equipment is detected by said network device, said efficiency function being evaluated based on at least one metric derived from said at least one item of information and from an attack detection efficiency of the user equipment.

15. A network device comprising:

a processor; and a non-transitory computer-readable medium comprising instructions stored thereon which when executed by the processor configure the network device to:

receive an alert message from a user equipment connected to the network, this alert message notifying of an anomaly detected by the user equipment in traffic transmitted via the network;

obtain, from the alert message, at least one item of information representative of at least one constraint of the user equipment;

process, by way of a cyber attack detection algorithm, features of the traffic that are provided by the user equipment and associated with the detected anomaly, the cyber attack detection algorithm being selected and/or parameterized on the basis of said at least one item of information; and determine, on the basis of a result of the processing, and in response to a cyber attack being detected, of said at least one item of information, a response to the user equipment concerning the detected anomaly, wherein the determining comprises evaluating a function, called efficiency function, based on at least one metric derived from said at least one item of information and from an attack detection efficiency of the user equipment, the response been determined on the basis of the value of the efficiency function.

16. A security operations center supervising at least one network, comprising:

a processor; and a non-transitory computer-readable medium comprising instructions stored thereon which when executed by the processor configure the security operations center to:

receive, from a network device, an alert message notifying of an anomaly detected by a user equipment connected to the network or by the network device in traffic transmitted via said network, this alert message comprising features of the traffic that are obtained by the user equipment or by the network device and associated with the detected anomaly, and at least one item of information representative of at least one constraint of the network device;

process, by way of a cyber attack detection algorithm, said features of the traffic, the detection algorithm being selected and/or parameterized on the basis of said at least one item of information; and determine, on the basis of a result of the processing step and, in response to an attack being detected, of said at least one item of information, a response to the network device and/or to the user equipment concerning the detected anomaly, wherein the determining comprises evaluating a function, called efficiency function, based on at least one metric derived from said at least one item of information and from an attack detection efficiency of the user equipment, the response been determined on the basis of the value of the efficiency function.

17. A user equipment connected to a network, comprising:

a processor; and a non-transitory computer-readable medium comprising instructions stored thereon which when executed by the processor configure the user equipment to:

detect an anomaly in traffic transmitted via the network from features of the traffic that are obtained by the user equipment;

in response to the user equipment being incapable of determining whether the detected anomaly corresponds to normal behavior or to a cyber attack, send, to a network device, an alert message notifying the network device of the detected anomaly, this alert message comprising said features of the traffic and at least one item of information representative of at least one constraint of the user equipment; and receive a message from the network device concerning the detected anomaly and created on the basis of a value of an efficiency function evaluated by said network device when a cyber attack against said user equipment is detected by said network device, said efficiency function being evaluated based on at least one metric derived from said at least one item of information and from an attack detection efficiency of the user equipment.

18. A monitoring system for monitoring a network, comprising:

at least one user equipment connected to the network, each of which comprising:

a first processor; and a first non-transitory computer-readable medium comprising instructions stored thereon which when executed by the first processor configure the user equipment to:

detect an anomaly in traffic transmitted via the network from features of the traffic that are obtained by the user equipment;

in response to the user equipment being incapable of determining whether the detected anomaly corresponds to normal behavior or to a cyber attack, send, to at least one network device, an alert message notifying the at least one network device of the detected anomaly, this alert message comprising said features of the traffic and at least one item of information representative of at least one constraint of the user equipment; and receive a message from the at least one network device concerning the detected anomaly and created on the basis of a value of an efficiency function evaluated by said network device when a cyber attack against said user equipment is detected by said network device, said efficiency function being evaluated based on at least one metric derived from said at least one item of information and from an attack detection efficiency of the user equipment;

the at least one network device, each of which comprising:

a second processor; and a second non-transitory computer-readable medium comprising instructions stored thereon which when executed by the processor configure the network device to:

receive the alert message from the user equipment;

obtain, from the alert message, the at least one item of information representative of at least one constraint of the at least one user equipment;

process, by way of a cyber attack detection algorithm, features of the traffic that are provided by the at least one user equipment and associated with the detected anomaly, the cyber attack detection algorithm being selected and/or parameterized on the basis of said at least one item of information; and determine, on the basis of a result of the processing, and in response to a cyber attack being detected, of said at least one item of information, a response to the user equipment concerning the detected anomaly, wherein the determining comprises evaluating the efficiency function, based on the at least one metric derived from said at least one item of information and from the attack detection efficiency of the user equipment, the response been determined on the basis of the value of the efficiency function; and a security operations center supervising the network, comprising:

a third processor; and a third non-transitory computer-readable medium comprising instructions stored thereon which when executed by the third processor configure the security operations center to:

receive, from the at least one network device, the alert message notifying of the anomaly detected by the at least one user equipment connected to the network or by the at least one network device in traffic transmitted via said network, this alert message comprising the features of the traffic that are obtained by the at least one user equipment or by the at least one network device and associated with the detected anomaly, and at least one item of information representative of at least one constraint of the network device;

process, by way of a cyber attack detection algorithm, said features of the traffic, the detection algorithm used by the security operations center being selected and/or parameterized on the basis of said at least one item of information received from the at least one network device; and determine, on the basis of a result of the processing step and, in response to an attack being detected, of said at least one item of information received from the at least network device, a response to the at least one network device and/or to the at least one user equipment concerning the detected anomaly.

19. The monitoring system as claimed in claim 18, wherein at least one of the at least one network device is an equipment of an access network of the network.

20. The monitoring system as claimed in claim 18, wherein at least one of the at least one network device is an equipment of a core network.

\* \* \* \* \*